(12) United States Patent
Kim

(10) Patent No.: US 9,573,524 B2
(45) Date of Patent: Feb. 21, 2017

(54) INSPECTION DEVICE AND METHOD OF HEAD UP DISPLAY FOR VEHICLE

(71) Applicants: Hyundai Motor Company, Seoul (KR); Kia Motors Corporation, Seoul (KR)

(72) Inventor: Dong Myong Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 14/551,017

(22) Filed: Nov. 23, 2014

(65) Prior Publication Data

US 2015/0168719 A1 Jun. 18, 2015

(30) Foreign Application Priority Data

Dec. 18, 2013 (KR) .................. 10-2013-0158591

(51) Int. Cl.
*G06K 9/00* (2006.01)
*B60R 1/00* (2006.01)
*G02B 27/01* (2006.01)

(52) U.S. Cl.
CPC .............. *B60R 1/00* (2013.01); *G02B 27/01* (2013.01); *B60R 2300/205* (2013.01);
(Continued)

(58) Field of Classification Search
CPC ..... B60R 1/00; B60R 2300/205; G02B 27/01; G02B 2027/0138; G02B 2027/014; G02B 2027/0154; G09G 2380/10
See application file for complete search history.

(56) References Cited

U.S. PATENT DOCUMENTS

| 5,015,145 A * | 5/1991 | Angell | .................. B65G 61/00 |
| | | | 414/391 |
| 2002/0040600 A1* | 4/2002 | Lenzen | .................... B66F 7/10 |
| | | | 73/432.1 |

(Continued)

FOREIGN PATENT DOCUMENTS

| DE | 102005037797 | * | 2/2007 | ............. B60K 35/00 |
| JP | 05-138088 | * | 6/1993 | ............. B05B 12/08 |

(Continued)

OTHER PUBLICATIONS

Fareh et al., "An Integrated Vision-Guided Robotic System for Rapid Vehicle Inspection", IEEE 2014.*

(Continued)

*Primary Examiner* — Amara Abdi
(74) *Attorney, Agent, or Firm* — Mintz Levin Ferris Glovsky and Popeo, P.C.; Peter F. Corless

(57) ABSTRACT

The inspection device of a head-up display (HUD) for a vehicle automatically inspects and corrects images projected on a windshield glass of the vehicle by an HUD unit in the vehicle and may include i) a frame where the vehicle is conveyed in-and-out, ii) a moving unit coupled to the frame and reciprocating in the front-and-rear and left-and-right directions of the vehicle, iii) a multi-axis robot mounted on the moving unit and configured to move the vehicle in an up-and-down and back-and-forth direction, iv) a vision camera mounted on an arm of the multi-axis robot and digitally capturing images projected on the windshield glass as vision data, and v) a controller inspects whether the HUD unit operates normally and controls operation of the HUD unit by analyzing the vision data acquired from the vision camera.

22 Claims, 7 Drawing Sheets

(52) U.S. Cl.
CPC ......... *G02B 2027/014* (2013.01); *G02B 2027/0138* (2013.01); *G02B 2027/0154* (2013.01); *G09G 2380/10* (2013.01)

(56) References Cited

U.S. PATENT DOCUMENTS

| | | | | |
|---|---|---|---|---|
| 2007/0075048 | A1* | 4/2007 | Kunisaki | B23K 11/253 |
| | | | | 219/91.1 |
| 2009/0133728 | A1* | 5/2009 | Kim Brillouet | B08B 3/00 |
| | | | | 134/57 R |
| 2010/0172542 | A1* | 7/2010 | Stein | G06K 9/00798 |
| | | | | 382/103 |
| 2010/0238291 | A1* | 9/2010 | Pavlov | B60R 11/04 |
| | | | | 348/148 |
| 2013/0014370 | A1* | 1/2013 | Shimizu | B62D 65/06 |
| | | | | 29/426.2 |
| 2013/0044138 | A1* | 2/2013 | Koga | B60K 35/00 |
| | | | | 345/672 |
| 2014/0218268 | A1* | 8/2014 | Olesen | B60R 1/00 |
| | | | | 345/7 |

FOREIGN PATENT DOCUMENTS

| | | | | |
|---|---|---|---|---|
| JP | 05-138088 A | 6/1993 | | |
| JP | 2007-331853 | * 12/2007 | | B66F 7/28 |

OTHER PUBLICATIONS

Sanngoen et al., "Under-Vehicle Inspection Utilizing a Mobile Robot with a LRF Sensor", IEEE 2013.*

* cited by examiner

INSPECTION DEVICE AND METHOD OF HEAD UP DISPLAY FOR VEHICLE

CROSS-REFERENCE TO RELATED APPLICATION

This application claims priority to and the benefit of Korean Patent Application No. 10-2013-0158591 filed in the Korean Intellectual Property Office on Dec. 18, 2013, the entire contents of which are incorporated herein by reference.

BACKGROUND (a) Technical Field

An exemplary embodiment of the present disclosure relates to an inspection device of a head-up display for a vehicle. More particularly, the present disclosure relates to an inspection device and method of a head-up display which inspect and correct the operation of a head-up display for a vehicle in a vehicle inspection line.

(b) Description of the Related Art

Recently, vehicles are equipped with a DAS (Driver Assistance System) to provide drivers with convenience and safety while the vehicles are in motion. The DAS keeps track of the driving lane, gives an alarm for straying from the driving lane, secures a safe distance from adjacent vehicles, prevents a collision with adjacent obstacles, and controls speed in accordance with the traffic situations or road environments, using various cameras and radar sensors etc. without an instruction from a driver.

DASs have previously been mounted only in expensive cars, but recently, they are increasingly in use for middle and small cars with a growing focus on eco-friendly, economical driving for protecting the environment and saving energy resources. For example, a DAS may include an SCC (Smart Cruise Control), a LDWS (Lane Departure Warning System), a BSD (Blind Spot Detection), an AVM (Around View Monitoring System) and a HUD (Head Up Display). In those systems, the HUD unit is a system that displays various items of information for driving a vehicle, such as the driving information of the vehicle or navigation information, on the windshield glass within the main view of the driver while the vehicle is in motion. The HUD unit can display images of various items of information on the windshield glass of a vehicle by reflecting and enlarging the images with a projector and an optical unit.

The HUD unit is typically inspected in a vehicle inspection line, and in this inspection process, it can be determined whether distorted images are displayed due to, for example, variation of an anti-double reflection film in the windshield glass, the quality of the HUD system, and/or assembly variation of the vehicle, when the images are projected to the windshield glass. Inspection can be accomplished through a series of preparation processes for inspection, including moving the glass down or back, connecting a communication connector, installing a shield, operating a tester, inputting the tester, and the like, and also through a post-inspection process performed in the reverse order of the preparation process. However, since the HUD inspection process is usually performed manually by workers, the inspection cycle time increases, the work efficiency is deteriorated, and there is difficulty in using the inspectors and managing the quality.

The Description of the Related Art is made to help understanding the background of the present disclosure and may include matters out of the related art known to those skilled in the art. The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an inspection device and method of a head-up display for a vehicle having advantages of being able to automatically inspect the image quality of an HUD unit and correct images distorted by bad operation of the HUD unit.

An exemplary embodiment of the present disclosure provides an inspection device of a head-up display (HUD) for a vehicle, which automatically inspects and corrects images projected on the windshield glass of a vehicle by an HUD unit in the vehicle, and which may include i) a frame where the vehicle is conveyed in/out, ii) a moving unit reciprocating in the front-and-rear and left-and-right directions of the vehicle, over the frame, iii) a multi-axis robot mounted on the moving unit configured to move up and down, and moved into and out of the vehicle, iv) a vision camera mounted on an arm of the multi-axis robot and digitally capturing images projected on the windshield glass as vision data, and v) a controller inspects whether the HUD unit normally operates and controls the operation of the HUD unit by analyzing the vision data acquired from the vision camera.

The inspection device of a head-up display for a vehicle according to an exemplary embodiment of the present disclosure may further include an aligning unit disposed on a base of the frame and aligning the vehicle at a predetermined position. The lifting member may include a telescopic cylinder connected with the multi-axis robot and vertically mounted on the moving unit. The telescopic cylinder may include a connecting bracket connected to the moving unit, a plurality of actuating pipes mounted on the connecting bracket through a mounting bracket and operated in a multi-step, forward-and-backward manner by hydraulic pressure, and a coupling bracket connected with the actuating pipes and combined with the multi-axis robot. The mounting bracket and the coupling bracket may be connected through a safe rod. The moving unit may include a first moving member sliding forward-and-backward over the frame, and a second moving member mounted on the first moving member to slide left-and-right and carrying the lifting member. A sensing unit that senses obstacles around the vision camera may be mounted on the multi-axis robot. The vision camera and the sensing unit may be mounted on the arm of the multi-axis robot through a sensor bracket. The sensor bracket may be rotated 360-degrees on the arm of the multi-axis robot by a rotation motor. The sensing unit may include un ultrasonic wave sensor. A roll screen moving toward a front of the vehicle and blocking the front of the vehicle may be disposed over the frame. A reference pattern for correcting a measurement point of the vision camera and inspecting and correcting the image may be formed on the roll screen.

Another exemplary embodiment of the present disclosure provides an inspection method of a head-up display for a vehicle, which uses the inspection device of a head-up display for a vehicle that automatically inspects and corrects images projected on the windshield glass of a vehicle from an HUD unit in the vehicle. The method may include (a) connecting a communication connector, when the vehicle is conveyed on a frame, (b) moving down a multi-axis robot to the vehicle by means of a lifting member, and capturing an image projected on the windshield glass with a vision camera on the multi-axis robot as vision data, (c) inspecting whether the HUD unit normally operates by analyzing the vision data acquired by the vision camera, and d) controlling operation of the HUD and correcting the image when it is determined that the image on the windshield glass is distorted.

In the inspection method of a head-up display for a vehicle according to an exemplary embodiment of the present disclosure, in the process (a), when a vehicle is conveyed on the frame, the communication connector may be connected to the vehicle, the vehicle may be aligned at a predetermined position, and the windows of the vehicle may be moved down. In the process (b), obstacles around the vision camera may be sensed by a sensing unit and the sensing signals may be outputted to a controller. The operation of the lifting member may be stopped in accordance with a sensing signal from the sensing unit. The operation of the multi-axis robot may be stopped in accordance with a sensing signal from the sensing unit. In the process (a), when the vehicle is conveyed on the frame, a roll screen may be unrolled down and block the front of the vehicle. In the process (b), the measurement point of a vision camera may be corrected on the basis of a reference pattern on the roll screen. In the process (c), the center of an inspection pattern may be inspected on the basis of the reference pattern by sending out the inspection pattern to the reference pattern. In the process (d), the operation of the HUD unit may be controlled and the distorted image may be corrected on the basis of the result of comparing the reference pattern with the inspection pattern.

According to an exemplary embodiment of the present disclosure, since it is possible to automatically inspect whether the HUD unit is normally operating, including whether images projected on the windshield glass of the vehicle are distorted, and automatically correcting distorted images, it is thus possible to cycle the time for inspecting the HUD unit and improve the work efficiency of inspection. Further, since inspection and correction of the HUD unit are automatically performed, it is possible to efficiently manage the inspectors and the quality thereof, and to inspect and correct the HUD units in different kinds of vehicles. Further, it is possible to actively cope with flexible production of several kinds of vehicles and reduce the additional manpower and investment cost for reconstructing and newly manufacturing correcting/inspecting facilities.

BRIEF DESCRIPTION OF THE DRAWINGS

The drawings are provided for reference in describing exemplary embodiments of the present disclosure and the spirit of the present disclosure should not be construed only by the accompanying drawings.

DETAILED DESCRIPTION OF THE EMBODIMENTS

Figure 1:
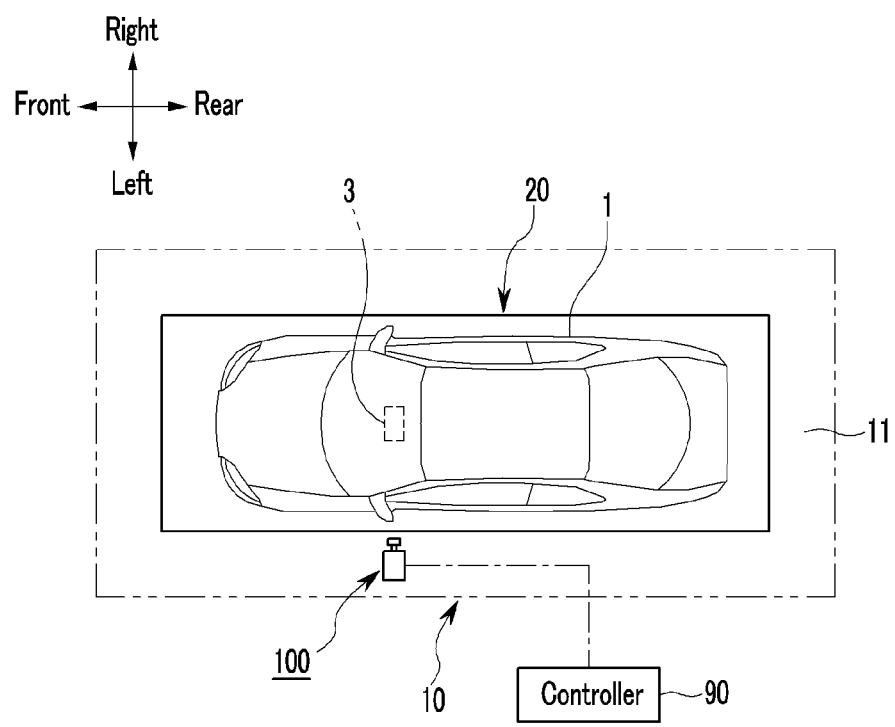
FIGS. 1 and 2 are block diagrams showing the configuration of an inspection device of a head-up display for a vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. Further, the sizes and thicknesses of the configurations shown in the drawings are provided selectively for the convenience of description, so that the present disclosure is not limited to those shown in the drawings and the thicknesses are exaggerated to make some parts and regions clear. Discriminating the names of components with the first, and the second, etc. in the following description is for discriminating them for the same relationship of the components, and the components are not limited to the order in the following description.

Throughout the specification, unless explicitly described to the contrary, the word "comprise" and variations such as "comprises" or "comprising", will be understood to imply the inclusion of stated elements but not the exclusion of any other elements. Further, the terms, " . . . unit", " . . . mechanism", " . . . portion", " . . . member" etc. used herein mean the unit of inclusive components performing at least one or more functions or operations.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
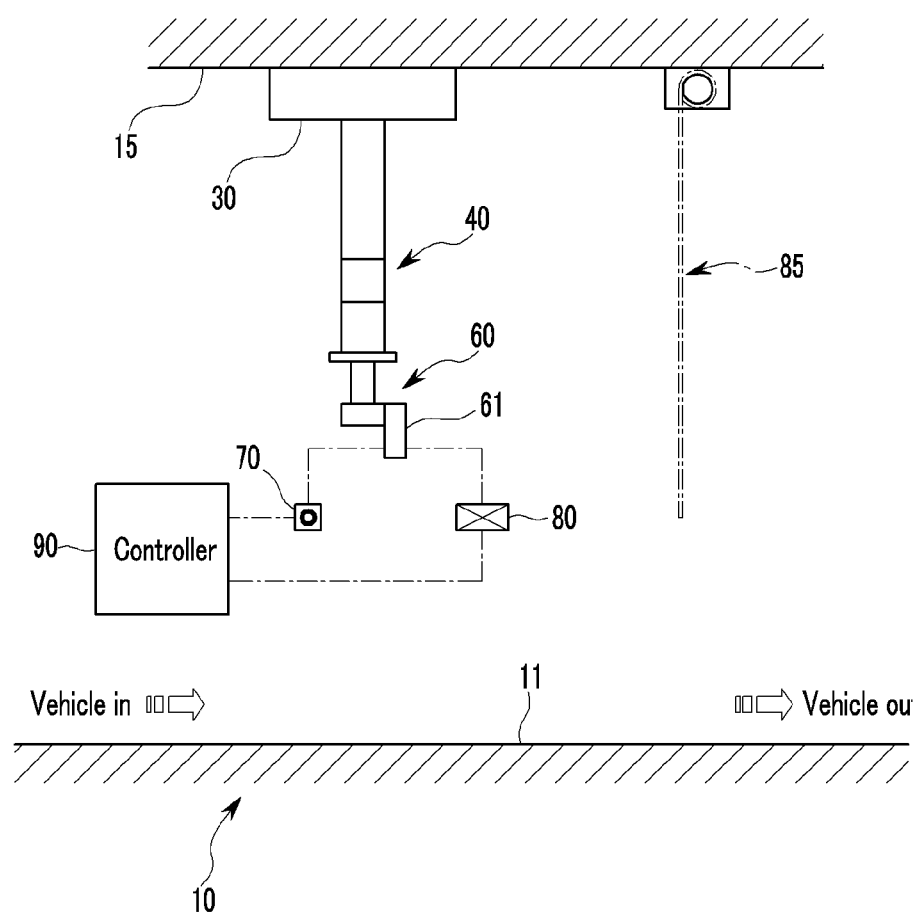

FIGS. 1 and 2 are block diagrams schematically showing the configuration of an inspection device of a head-up display for a vehicle according to an exemplary embodiment of the present disclosure.

Referring to FIGS. 1 and 2, an inspection device 100 of a head-up display for a vehicle according to an exemplary embodiment of the present disclosure may be installed in a vehicle inspection line for inspecting and correcting a head-up display (hereafter, referred to as 'HUD') unit 3 that is mounted on a finished vehicle 1 in a vehicle assembly process.

The HUD unit 3 displays various items of information for driving the vehicle 1 such as the driving information of the vehicle 1 or navigation information on the windshield, within the main view of the driver while the vehicle 1 is in motion. The HUD unit 3 basically includes a projector that projects an image beam and an optical unit that reflects and enlarges the image beam to the windshield glass of the vehicle 1.

The configuration and operation of the HUD unit 3 are known well in the art and the detailed description is not provided herein.

The HUD unit 3 may project distorted images due to variation of an anti-double reflection film in the windshield glass, the quality of the HUD system, and assembly variation of the vehicle, when projecting the images to the windshield glass.

Accordingly, in an exemplary embodiment of the present disclosure, it is required to inspect whether the HUD unit 3 normally operates, for example, whether the projected images are distorted by the influences described above, and when a projected image is distorted, it is required to correct the image on the windshield glass by controlling the operation of the HUD unit 3 such as outputting, reflecting, and enlarging images.

That is, the inspection device 100 of a head-up display for a vehicle according to an exemplary embodiment of the present disclosure can automatically inspect the quality of images made by the HUD unit 3 and correct images distorted by bad operation of the HUD unit 3.

To this end, the inspection device 100 of a head-up display for a vehicle according to an exemplary embodiment of the present disclosure basically includes an aligning unit 20, a moving unit 30, a lifting member 40, a multi-axial robot 60, a vision camera 70, a sensing unit 80, and a controller 90.

In the art, the feeding direction of a vehicle body is called a 'T-direction, the width direction of a vehicle body is called an 'L-direction', and the height direction of a vehicle body is called an 'H-direction'. In an exemplary embodiment of the present disclosure, however, the directions are not based on the L-, T-. and H-directions, but set as the front-rear direction, the left-right direction, and the up-down direction of a vehicle.

Various constituent elements to be described hereafter are mounted on a frame 10, which includes accessories such as a bracket, a plate, a housing case, a block, and a collar for supporting the constituent elements.

However, since the accessories are provided for supporting various constituent elements on the frame 10, the accessories are generally referred to as the frame 10, except for exceptional cases, in the exemplary embodiment of the present disclosure.

The frame 10 provides a base 11 that is level with the floor of the inspection worksite and on which the vehicle can move in and out. A pillar fame 30 is disposed at each corner of the base 11 and the vehicle 1 can move in and out through between the pillar frames 13 on the base 11.

A top frame 15 formed in the shape of a lattice and connecting the tops of the pillar frames 13 is disposed over the frame 10.

In an exemplary embodiment of the present disclosure, the aligning unit 20, which is a part for aligning different kinds of vehicles 1 at a predetermined position, is disposed on the base 11 of the frame 10.

That is, the aligning unit 20 is provided for aligning the vehicle 1 in the front-rear direction and the left-right direction, depending on different kinds of wheel bases, in order to accurately inspect and correct the HUD unit 3.

The aligning unit 20 may include, for example, a front wheel stopper and a rear wheel support (not shown) for aligning the vehicle 1 in the front-rear direction, and a front wheel pusher and a rear wheel pusher (not shown) for aligning the vehicle 1 in the left-right direction.

The rear wheel support and the front wheel stopper support the rear wheels and the front wheels of the vehicle 1, respectively, and may include free rollers that can determined the front-rear-directional position of the vehicle 1.

The front wheel pusher and the rear wheel pusher align the front wheels and the rear wheels of the vehicle 1, respectively, in both directions (left and right directions), and for example, they may align the front wheels and the rear wheels of the vehicle 1 in the left-right direction by moving in the left-right direction, using actuating cylinders.

Figure 3:
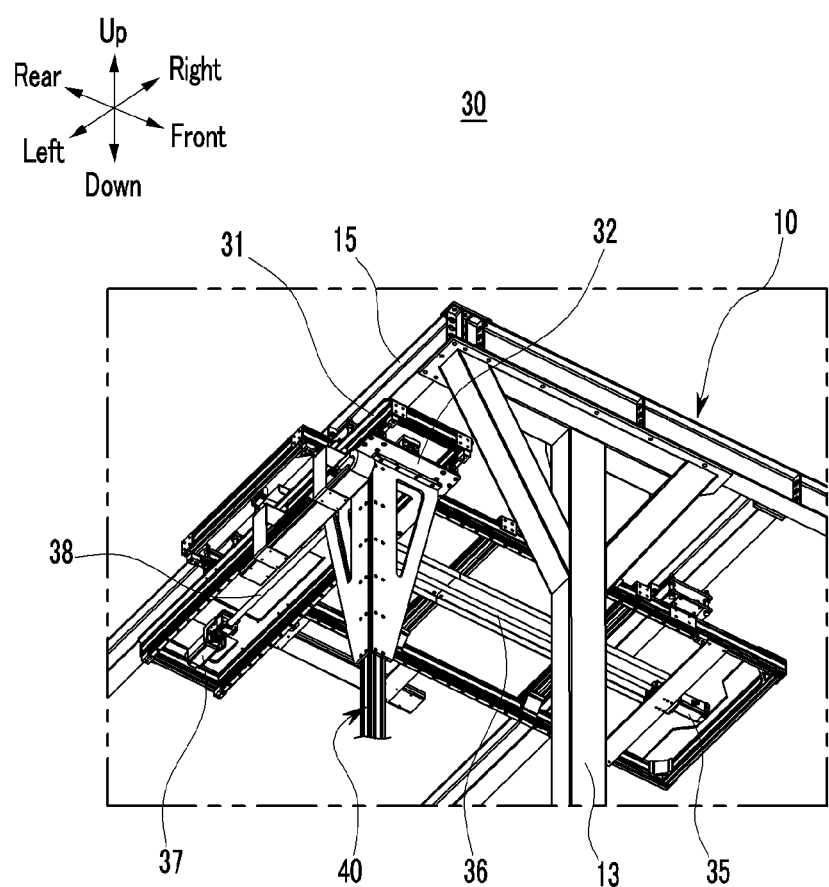
FIG. 3 is a view showing a moving unit in the inspection device of a head-up display for a vehicle according to an exemplary embodiment of the present disclosure.

FIG. 3 is a view showing a moving unit in the inspection device of a head-up display for a vehicle according to an exemplary embodiment of the present disclosure.

Referring to FIGS. 1 to 3, the moving unit 30 according to an exemplary embodiment of the present disclosure is provided for reciprocating the multi-axis robot 60, which is described in detail below, forward/backward and left/right with respect to the vehicle 1.

The moving unit 30 is installed on the top frame 15 and includes a first moving member 31 and a second moving member 32. The first moving member 31 is mounted on the top frame 15 and can be slid forward/backward by a guiding mechanism or a sliding mechanism. The second moving member 32 is mounted on the first moving member 31 and can be slid left/right by a guiding mechanism or a sliding mechanism. In this configuration, the lifting member 40 to be described in detail below may be mounted on the second moving member 32.

The first moving member 31 can be reciprocated forward/backward with respect to the top frame 15 by a first servo motor 35 and a first lead screw 36. The first servo motor 35 is fixed to the top frame 15. The first lead screw 36 is arranged in the front-rear direction of the top frame 15 and connected to the driving shaft of the first servo motor 35, and can substantially rotate on the top frame 15. The first lead screw 36 is in mesh with a specific block fixed to the first moving member 31.

The second moving member 32 can be reciprocated left/right with respect to the first moving member 31 by a second servo motor 37 and a second lead screw 38. The second servo motor 37 is fixed to the first moving member 31. The second lead screw 38 is arranged in the left-right direction of the first moving member 31 and connected to the driving shaft of the second servo motor 37, and can substantially rotate on the first moving member 31. The second lead screw 38 is in mesh with a specific block fixed to the second moving member 32.

Referring to FIGS. 1 and 2, in an exemplary embodiment of the present disclosure, the lifting member 40 is provided for moving the multi-axis robot 60, which is described in detail below, up/down with respect to the moving unit 30. The lifting member 40 is connected to the second moving member 32 of the moving unit 30 and may be connected with the multi-axis robot 60. The lifting member 40 is vertically mounted on the second moving member 32 of the moving unit 30 and includes a telescopic cylinder 41 connected with the multi-axis robot 60.

The telescopic cylinder 41, which is also called a 'telescopic support' or a 'telescopic pillar', may be implemented in a telescopic type with an actuator that can extend and contract in a multi-step.

Figure 4:
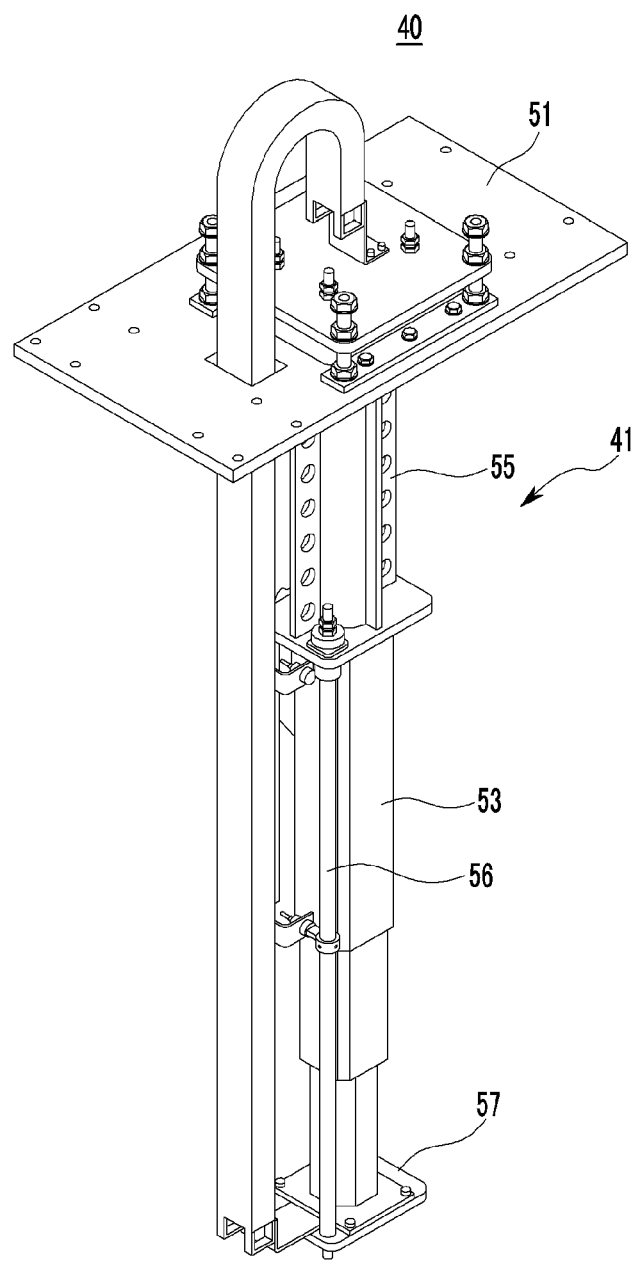
FIG. 4 is a perspective view showing a lifting member in the inspection device of a head-up display for a vehicle according to an exemplary embodiment of the present disclosure.

FIG. 4 is a perspective view showing a lifting member in the inspection device of a head-up display for a vehicle according to an exemplary embodiment of the present disclosure.

Referring to FIGS. 2 and 4, the telescopic cylinder 41 according to an exemplary embodiment of the present disclosure includes a connecting bracket 51 connected to the second moving member 32 of the moving unit 30 and a plurality of actuating pipes 53 on the connecting bracket 51.

The actuating pipes 53 are cylindrical telescopic pipes that can extend and contract in a multi-step by vertically moving in/out by means of the force from hydraulic pressure or compressed air. The actuating pipes 53 are connected to the connecting bracket 51 through a mounting bracket 55.

A coupling bracket 57 for coupling the multi-axis robot 60 to be described in detail below is fixed to the actuating end of the actuating pipe 53, that is, the lower end of the actuating pipe 53 in the figures.

Further, the mounting bracket 55 of the telescopic cylinder 41 and the coupling bracket 57 may be connected through a safe rod 56. The safe rod 56 guides the actuating pipe 53 extending and contracting and prevents the actuating bracket 53 from falling off the mounting bracket 55.

Both ends of the safe rod 56 are connected to the mounting bracket 55 and the coupling bracket 57, respectively, that is, one end (upper end in the figures) is fixed to the mounting bracket 55 and the other end (lower end in the figures) is disposed vertically through the coupling bracket 57.

In this configuration, the other end of the safe rod 56 may be coupled not to be separated from the coupling bracket 57 by an anti-separation member such as a nut and may be supported by the coupling bracket 57 through a support member such as a ball bearing.

Referring to FIGS. 1 and 2, the multi-axis robot 60 according to an exemplary embodiment of the present disclosure can be vertically moved by the lifting member 40 described above and can move into/out of the vehicle through the windows of the vehicle 1.

The multi-axis robot 60, which is a 6-axis articulated robot, is a well-known robot system that is teaching-controlled by the controller 90 and can move and rotate the joints in several directions.

Figure 5:
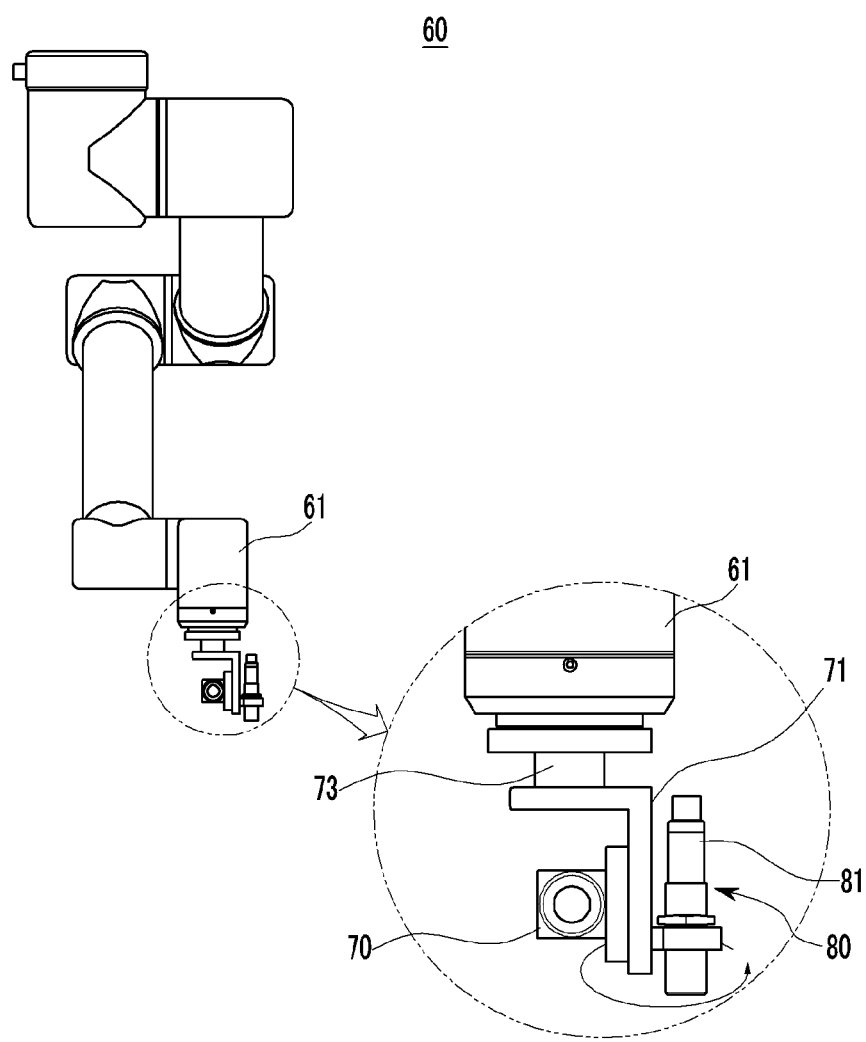
FIG. 5 is a view showing a multi-axis robot in the inspection device of a head-up display for a vehicle according to an exemplary embodiment of the present disclosure.

FIG. 5 is a view showing a multi-axis robot in the inspection device of a head-up display for a vehicle according to an exemplary embodiment of the present disclosure.

Referring to FIGS. 2 and 5, the multi-axis robot 60 according to an exemplary embodiment of the present disclosure has an arm 61 that is moved in multi-axis directions under teaching-control. The multi-axis robot 60 may be coupled to the coupling bracket 57 of the telescopic cylinder 41.

In an exemplary embodiment of the present disclosure, the vision camera 70, as shown in FIGS. 1 and 2, takes the vision of images projected on the inner side of the windshield glass from the HUD unit 3 and outputs the vision data to the controller 90.

The vision camera 70 is also called a vision sensor in the art and, as shown in FIG. 5, it is mounted on the arm 61 of the multi-axis robot 60. The vision camera 70 is mounted on the multi-axis robot 60 through a sensor bracket 71.

The vision camera 70 is a vision system known in the art, so the configuration is not described in detail herein.

The sensor bracket 71 is mounted on the free end of the arm 61 of the multi-axis robot 60 and can be rotated by a rotation motor 73 such as a servo motor known in the art. That is, the vision camera 70 can be freely rotated at 360 degrees at the free end of the arm 61 of the multi-axis robot 60 by the rotation motor 73.

In an exemplary embodiment of the present disclosure, the sensing unit 80 senses obstacles around the vision camera 70, that is, a worker and the windows of the vehicle 1 and outputs the sensing signal to the controller 90, as shown in FIGS. 1 and 2.

As shown in FIG. 5, the sensing unit 80 is mounted on the sensor bracket 71 described above, together with the vision camera 70. Since the sensing unit 80 is mounted on the sensor bracket 71, similar to the vision camera 70, it can be rotated free at 360 degrees at the free end of the multi-axis robot 60 by the rotation motor 73.

The sensing unit 80, for example, includes an ultrasonic wave sensor 81 that senses whether there is an obstacle by sending out ultrasonic wave signals and receiving the ultrasonic wave signals reflecting from obstacles. The ultrasonic wave sensor 81 is an ultrasonic wave sensing unit known in the art, so the configuration is not described in detail herein.

Referring to FIGS. 1 and 2, the inspection device 100 of a head-up display for a vehicle according to an exemplary embodiment of the present disclosure includes a roll screen 81 for separating the vehicle 1 ahead with the inspection and correction of the HUD unit 3 finished and a vehicle 1 behind with the HUD unit 3 to be inspected in the inspection worksite.

That is, the vehicle with the inspection and correction of the HUD unit 3 finished is on standby for the next process, and when, with the HUD unit 3 of the vehicle 1 behind the vehicle ahead is inspected and corrected, the vision camera 70 may make an error in vision sensing due to the light from the taillights of the vehicle ahead.

Accordingly, in an exemplary embodiment of the present disclosure, it is possible to block the light that travels to the vehicle ahead from the taillights of the vehicle ahead by installing the roll screen between the vehicle ahead and the vehicle behind.

Figure 6:
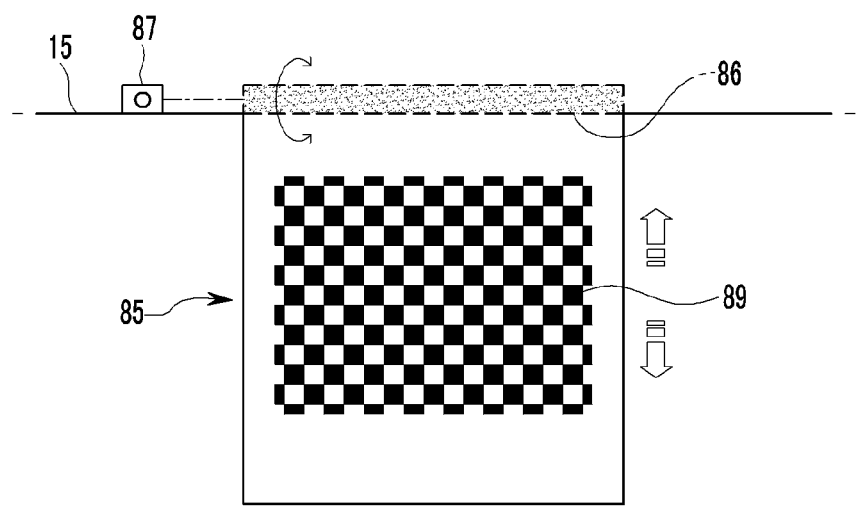
FIG. 6 is a view schematically showing a roll screen in the inspection device of a head-up display for a vehicle according to an exemplary embodiment of the present disclosure.

FIG. 6 is a view schematically showing a roll screen in the inspection device of a head-up display for a vehicle according to an exemplary embodiment of the present disclosure.

Referring to FIGS. 2 and 6, the roll screen 85 according to an exemplary embodiment of the present disclosure is mounted on the top frame 15 and can block the vehicle ahead by unrolling down ahead of the vehicle behind. The roll screen 85 is rolled around a rotary shaft 86 rotatably mounted on the top frame 15 and it can be unrolled down by rotation of the rotary shaft 86.

That is, as the rotary shaft 86 rotates in one direction, the roll screen 85 can be unrolled down from the rotary shaft 86, and as the rotary shaft 86 rotates in another direction, the roll screen 85 can be rolled up around the rotary shaft 86. The rotary shaft 86 can be rotated in one direction and another direction by a motor 87 mounted to the top frame 15.

The length between the roll screen 85 and a ghost image designed according to automatic vehicle model may be varied, and thus the motor 87 may be moveably installed to the top frame 15 in the longitudinal direction of a vehicle.

Further, the roll screen 85 according to an exemplary embodiment of the present disclosure has a reference pattern 89 for correcting the measurement point of the vision camera 70 and inspecting and correcting images taken by the vision camera 70, on the screen side facing the vehicle ahead.

That is, the reference pattern 89 of the roll screen 85 periodically performs calibration on the vision camera 70 to improve vision measurement accuracy of the vision camera 70.

Further, the reference pattern 89, which is a comparison pattern of the inspection pattern from the HUD unit 3, is used for inspecting distortion of images and correcting the distorted images.

The reference pattern 89 is printed in a predetermined shape on the side of the roll screen 85 which faces the vehicle ahead.

The reference pattern 89 may have rectangular dot patterns in which a cross shape may be arranged at the central position thereof so as to be used as a central reference point in case of calibrating the vision camera 70.

On the other hand, the controller 90 according to an exemplary embodiment of the present disclosure, which is provided for controlling the entire operation of the inspection device 100, extracts whether the HUD unit 3 normally operates, including whether a distorted image is projected, by acquiring and analyzing the vision data of images from the vision camera 70, and corrects the distorted images.

That is, the controller 90 calculates the distortion amount of an image acquired from the vision camera 70 into a vector value by comparing the image with the existing image, inspects whether the HUD unit 3 normally operates on the basis of the calculated value, and corrects the image by transmitting the calculated value to the HUD unit 3.

Further, the controller 90 receives the sensing signals from the sensing unit 80 described above and checks in real time obstacles around the vision camera 70, for example, a worker and the windows of the vehicle in response to the sensing signals.

The controller 90 receives a sensing signal from the sensing unit 80 and checks a worker approaching the inspection position, when the multi-axis robot 60 is moved down to the vehicle 1 by the lifting member 40, and when it is determined that a worker approached the inspection position, the controller 90 can stop the lifting member 40.

Further, the controller 90 receives a sensing signal from the sensing unit 80 and checks the down state of a window, when the multi-axis robot 60 is moved to the window of the vehicle 1, and when it is determined that the window has moved up, the controller 90 can stop the multi-axis robot 60.

Hereinafter, an inspection method of a head-up display for a vehicle, using the inspection device 100 of a head-up display for a vehicle according to an exemplary embodiment of the present disclosure, is described in detail.

Figure 7:
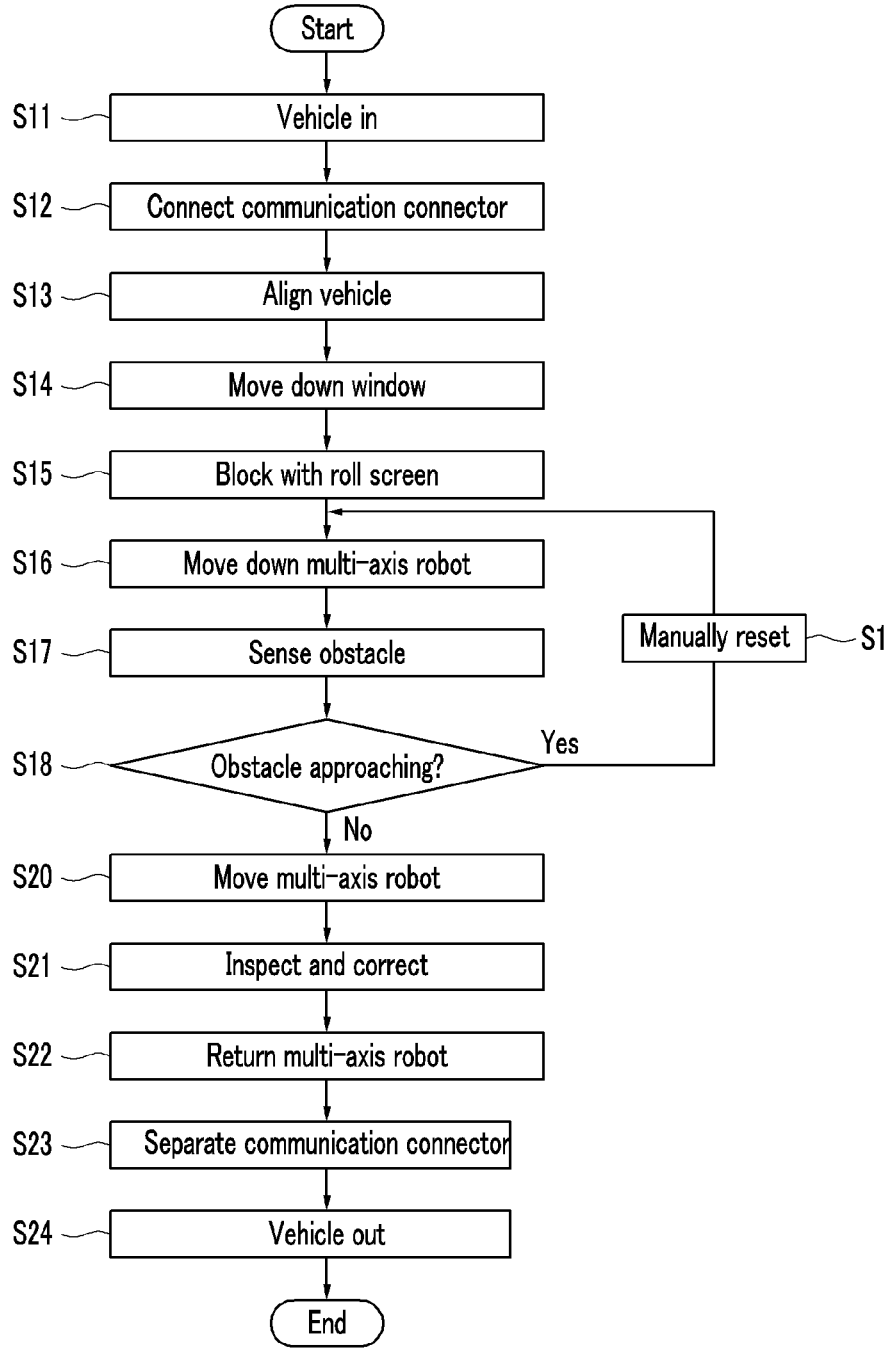
FIG. 7 is a flowchart illustrating an inspection method of a head-up display for a vehicle according to an exemplary embodiment of the present disclosure.

FIG. 7 is a flowchart illustrating an inspection method of a head-up display for a vehicle according to an exemplary embodiment of the present disclosure.

First, in an exemplary embodiment of the present disclosure, the vehicle 1 finished by assembling various parts in a vehicle assembly process is conveyed to the HUD inspection line. In the HUD inspection line, whether the HUD unit 3 normally operates is inspected, including whether a distorted image is projected on the windshield glass from the HUD unit 3, and distorted images are corrected.

In detail, in the process of inspecting and correcting the HUD unit 3, as shown in the figures referred above and FIG. 7, in an exemplary embodiment of the present disclosure, different kinds of vehicles 1 are conveyed onto the base of the frame 10 at the inspection position (S11). Next, a worker connects a communication connector such as an OBD to the vehicle 1 (S12).

Thereafter, in an exemplary embodiment of the present disclosure, the vehicles 1 are aligned in the front-rear direction by the front wheel stopper and the rear wheel support of the aligning unit 20 and in the left-right direction too by the front wheel pusher and the rear wheel pusher (S13). Accordingly, in an exemplary embodiment of the present disclosure, it is possible to set different kinds of vehicles 1 at a predetermined position on the base 11, using the aligning unit 20.

In this state, in an exemplary embodiment of the present disclosure, the window of the driver's seat of the vehicle 1 is moved down (S14). The controller 90 can move down the window by sending a window-opening signal to the vehicle 1 through the communication connector.

Further, in an exemplary embodiment of the present disclosure, a predetermined image is displayed on the windshield glass by operating the HUD unit 3. The controller 90 can operate the HUD unit 3 through the communication connector.

The multi-axis robot 60 has been moved up by the lifting member 40 and the roll screen 85 has been rolled up around the rotary shaft 86 that has rotated in another direction.

The multi-axis robot 60 has finished aligning by moving forward/backward and left/right by means of the moving unit 30 in accordance with the position of the vehicle 1 in place on the base 11.

Thereafter, in an exemplary embodiment of the present disclosure, the roll screen 85 rolled on the rotary shaft 86 is unrolled down by rotating the rotary shaft 86 in one direction, as described above, such that the front of the vehicle 1 is blocked by the roll screen 85 (S15).

Then, in an exemplary embodiment of the present disclosure, the vehicle above having the HUD unit 3 inspected and corrected and waits for the next process and the vehicle behind with the HUD unit 3 to be inspected (vehicle inside the frame) are blocked by the roll screen 85.

Accordingly, in an exemplary embodiment of the present disclosure, the light from the taillights of the vehicle ahead is prevented from traveling to the vehicle ahead and a vision sensing error of the vision camera 70 due to the light from the taillights of the vehicle ahead, which is described below, can be prevented.

After the process, in an exemplary embodiment of the present disclosure, the telescopic cylinder 41 of the lifting member 40 is operated and the multi-axis robot 60 is moved down to the window of the driver's seat of the vehicle 1 (S16).

In this process, in an exemplary embodiment of the present disclosure, the sensing unit 80 on the multi-axis robot 60 senses obstacles in the inspection worksite and outputs a sensing signal to the controller 90 (S17).

The sensing unit 80 can sense obstacles by sending out ultrasonic wave signals and receiving ultrasonic wave signals reflecting back from obstacles while being rotated at 360 by the rotation motor 73.

Then, the controller 90 checks a worker approaching the inspection position on the basis of the sensing signal from the sensing unit, and when it is determined that a worker approached the inspection position (S18), the controller 90 stops the lifting member 40.

Further, the controller 90 receives a sensing signal from the sensing unit 80 and checks the down state of a window, when the multi-axis robot 60 is moved to the window of the vehicle 1, and when it is determined that the window has moved up, the controller 90 sends a stop signal to the multi-axis robot 60.

In this case, the worker manually sends a reset signal to the lifting member 40 (S19). Accordingly, the multi-axis robot 60 is returned to the initial position by the lifting member 60 and the process described above is repeated.

Alternatively, when there is no obstacle sensed by the sensing unit 80 in the inspection worksite, the controller 90 makes the arm 61 of the multi-axis robot 60 move into the vehicle 1 by sending a teaching-control signal to the multi-axis robot 60 (S20).

Then, in an exemplary embodiment of the present disclosure, the vision camera 70 takes the vision of the reference pattern 89 on the roll screen 85 and outputs the vision data to the controller 90. Then, the controller 90 analyzes the vision data of the reference pattern 89 and corrects the measurement point of the vision camera 70, including the lens focal distance and the lens aperture scale.

In this state, in an exemplary embodiment of the present disclosure, the vision camera 70 takes the vision of the image projected on the inner side of the windshield glass of the vehicle and outputs the vision data to the controller 90. The controller 90 acquires the vision data of the image from the vision camera, and extracts whether the HUD unit 3 normally operates, including whether there is a distorted image, and corrects distorted images by analyzing the vision data (S21).

That is, the controller 90 calculates the distortion amount of an image acquired from the vision camera 70 into a vector value by comparing the image with the existing image, inspects whether the HUD unit 3 normally operates on the basis of the calculated value, and corrects the image by transmitting the calculated value to the HUD unit 3.

When there is a distorted image, the controller 90 corrects the image on the windshield glass by controlling the operation of sending, reflecting, and enlarging an image of the HUD unit 3.

In an exemplary embodiment of the present disclosure, inspection and correction of distorted images are performed through the reference pattern 89 printed on the roll screen 85, that is, the centers of inspection patterns are inspected and distorted images are corrected on the basis of the reference pattern 89 by projecting the inspection patterns onto the windshield glass through the HUD unit 3.

That is, the controller 90 corrects distorted images while inspecting the distorted images in real time by comparing the reference pattern on the roll screen 85 with the inspection patterns.

Accordingly, in an exemplary embodiment of the present disclosure, it is possible to automatically inspect whether the HUD unit 3 normally operates, including whether images projected on the windshield glass of the vehicle 1 are distorted, and automatically correct distorted images, through the series of processes described above.

Thereafter, the multi-axis robot 60 is returned to the initial position (S22), the communication connector is separated from the vehicle 1 (S23), and the vehicle 1 is conveyed out of the frame 10 (S24), thereby finishing the series of processes for inspecting a head-up display.

According to an exemplary embodiment of the present disclosure described above, since it is possible to automatically inspect whether the HUD unit 3 normally operates, including whether images projected on the windshield glass of the vehicle 1 are distorted, and automatically correct distorted images, it is possible to the cycle time for inspecting the HUD unit 3 and improve the work efficiency of inspection.

Further, in an exemplary embodiment of the present disclosure, since inspection and correction of the HUD unit 3 are automatically performed, it is possible to efficiently manage the inspectors and the quality and to inspect and correct the HUD units 3 in different kinds of vehicles 1.

Further, in an exemplary embodiment of the present disclosure, it is possible to actively cope with flexible production of several kinds of vehicles and reduce the additional manpower and investment cost for reconstructing and newly manufacturing correcting/inspecting facilities, depending on the kinds of new vehicles.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

<Description of symbols>

1 vehicle  3 HUD unit
10 frame  11 base
13 pillar frame  15 top frame
20 aligning unit  30 moving unit
31 first moving member  32 second moving member
35 first servo motor  36 first lead screw
37 second servo motor  38 second lead screw
40 lifting member  41 telescopic cylinder
51 connecting bracket  53 actuating pipe
55 mounting bracket  56 safe rod
57 coupling bracket  60 multi-axis robot
61 arm  70 vision camera
71 sensor bracket  73 rotation motor
80 sensing unit  81 ultrasonic wave sensor
85 roll screen  86 rotary shaft
87 motor  89 reference pattern
90 controller

What is claimed is:

1. An inspection device of a head-up display (HUD) for a vehicle which automatically inspects and corrects images projected on a windshield glass of the vehicle by an HUD unit in the vehicle, the device comprising:
   a frame that conveys the vehicle in a back-and-forth direction;
   a moving unit coupled to the frame and reciprocating in the front-and-rear and left-and-right directions of the vehicle;
   a multi-axis robot mounted on the moving unit via a lifting member and configured to move the vehicle in an up-and-down and back-and-forth direction;
   a vision camera mounted on an arm of the multi-axis robot that captures the images projected on the windshield glass as vision data; and
   a controller that inspects whether the HUD unit is operating normally and controls operation of the HUD unit by analyzing the vision data acquired from the vision camera.

2. The device of claim 1, further comprising
an aligning unit disposed on a base of the frame and aligning the vehicle at a predetermined position.

3. The device of claim 1, wherein:
the lifting member includes
a telescopic cylinder connected with the multi-axis robot and vertically mounted on the moving unit.

4. The device of claim 3, wherein:
the telescopic cylinder includes
a connecting bracket connected to the moving unit,
a plurality of actuating pipes mounted on the connecting bracket through a mounting bracket and operated forward-and-backward in a multi-step by hydraulic pressure, and
a coupling bracket connected with the actuating pipes and combined with the multi-axis robot.

5. The device of claim 4, wherein the mounting bracket and the coupling bracket is connected through a safe rod.

6. The device of claim 1, wherein:
the moving unit includes
a first moving member sliding forward-and-backward over the frame, and
a second moving member mounted on the first moving member to slide left-and-right and carrying the lifting member.

7. The device of claim 1, wherein:
a sensing unit that senses obstacles around the vision camera is mounted on the multi-axis robot.

8. The device of claim 7, wherein:
the vision camera and the sensing unit are mounted on the arm of the multi-axis robot through a sensor bracket, and
the sensor bracket is capable of 360-degree rotation on the arm of the multi-axis robot via a rotation motor.

9. The device of claim 7, wherein the sensing unit includes an ultrasonic wave sensor.

10. The device of claim 1, wherein:
a roll screen moving toward a front of a vehicle and blocking the front of the vehicle is disposed over the frame.

11. The device of claim 10, wherein:
a reference pattern for correcting a measurement point of the vision camera and inspecting and correcting the image is formed on the roll screen.

12. The device of claim 11, wherein:
the reference pattern includes rectangular dot patterns in which a cross-shape is formed at a central position thereof.

13. The device of claim 10, wherein:
the roll screen is moveably installed on the frame in a longitudinal direction of a vehicle.

14. An inspection method of a head-up display (HUD) in a vehicle which uses the inspection device of claim 1 for automatically inspecting and correcting an image projected on a windshield glass of the vehicle from the HUD unit in the vehicle, the method comprising:
(a) connecting a communication connector to the vehicle, when the vehicle is conveyed on a frame;
(b) moving down a multi-axis robot onto a vehicle by means of a lifting member, and capturing an image projected on the windshield glass as vision data with a vision camera on the multi-axis robot;
(c) inspecting whether the HUD unit operates normally by analyzing the vision data acquired by the vision camera; and
(d) controlling operation of the HUD and correcting the image when it is determined that the image on the windshield glass is distorted.

15. The method of claim 14, wherein:
in the process (a),
when the vehicle is conveyed on the frame, the communication connector is connected to the vehicle, the vehicle is aligned at a predetermined position, and the windows of the vehicle are moved down.

16. The method of claim 14, wherein:
in the process (b),
obstacles around the vision camera are sensed by a sensing unit, and the sensing signals are outputted to a controller.

17. The method of claim 16, wherein the operation of the lifting member is configured to be stopped in accordance with a sensing signal from the sensing unit.

18. The method of claim 16, wherein the operation of the multi-axis robot is configured to be stopped in accordance with a sensing signal from the sensing unit.

19. The method of claim 14, wherein:
in the process (a),
when the vehicle is conveyed on the frame, a roll screen is unrolled down and blocks a front of the vehicle.

20. The method of claim 19, wherein:
in the process (b),
a measurement point of the vision camera is corrected based on a reference pattern on the roll screen.

21. The method of claim 20, wherein:
in the process (c),
a center of an inspection pattern is inspected on a basis of the reference pattern by sending out the inspection pattern to the reference pattern.

22. The method of claim 21, wherein:
in the process (d),
the operation of the HUD unit is controlled and the distorted image is corrected according to a result of comparing the reference pattern with the inspection pattern.

* * * * *